United States Patent [19]

Stoltman

[11] 3,921,390
[45] Nov. 25, 1975

[54] FUEL CONTROLLER FOR GAS TURBINE ENGINE

[75] Inventor: Donald D. Stoltman, Henrietta, N.Y.

[73] Assignee: General Motors Corporation, Detroit, Mich.

[22] Filed: Sept. 16, 1974

[21] Appl. No.: 506,100

[52] U.S. Cl............ 60/39.27; 60/39.23; 60/39.28 R; 60/39.29; 60/39.16 R; 60/39.28 T
[51] Int. Cl.².... F02C 7/10; F02C 7/18; F02C 9/10; F02C 9/14
[58] Field of Search............... 60/39.27, 39.23, 39.29

[56] References Cited
UNITED STATES PATENTS

| | | | |
|---|---|---|---|
| 2,227,666 | 1/1941 | Noack | 60/39.23 X |
| 3,584,459 | 6/1971 | Amann | 60/39.27 X |
| 3,618,319 | 11/1971 | Kydd | 60/39.27 X |

FOREIGN PATENTS OR APPLICATIONS

| | | | |
|---|---|---|---|
| 858,477 | 12/1952 | Germany | 60/39.27 |

*Primary Examiner*—Clarence R. Gordon
*Attorney, Agent, or Firm*—J. C. Evans

[57] ABSTRACT

A control system for a two-shaft regenerative gas turbine has a low emission burner with a pedal operated throttle for proportioning the flow of primary and secondary air into a combustion chamber of the low emission burner and includes means for controlling fuel flow to maintain the outlet temperature of the burner in a range of temperatures to cover the power and speed range of the turbine engine. Secondary air is modulated to temper the turbine inlet temperature for a particular power level and speed of operation of the engine. The controller regulates the fuel supply at the burner in accordance with primary air flow by means for sensing the mass air flow to the engine compressor and means for automatically adjusting the fuel flow in correct proportion to the primary air flow to the burner so that the temperature of the primary combustion zone will be held at a desired level without adjusting the burner variable geometry or without sensing primary combustion zone temperature. An improved thermostat multiplier mechanism adjusts a fuel orifice to compensate for inlet air temperature to the burner.

4 Claims, 8 Drawing Figures

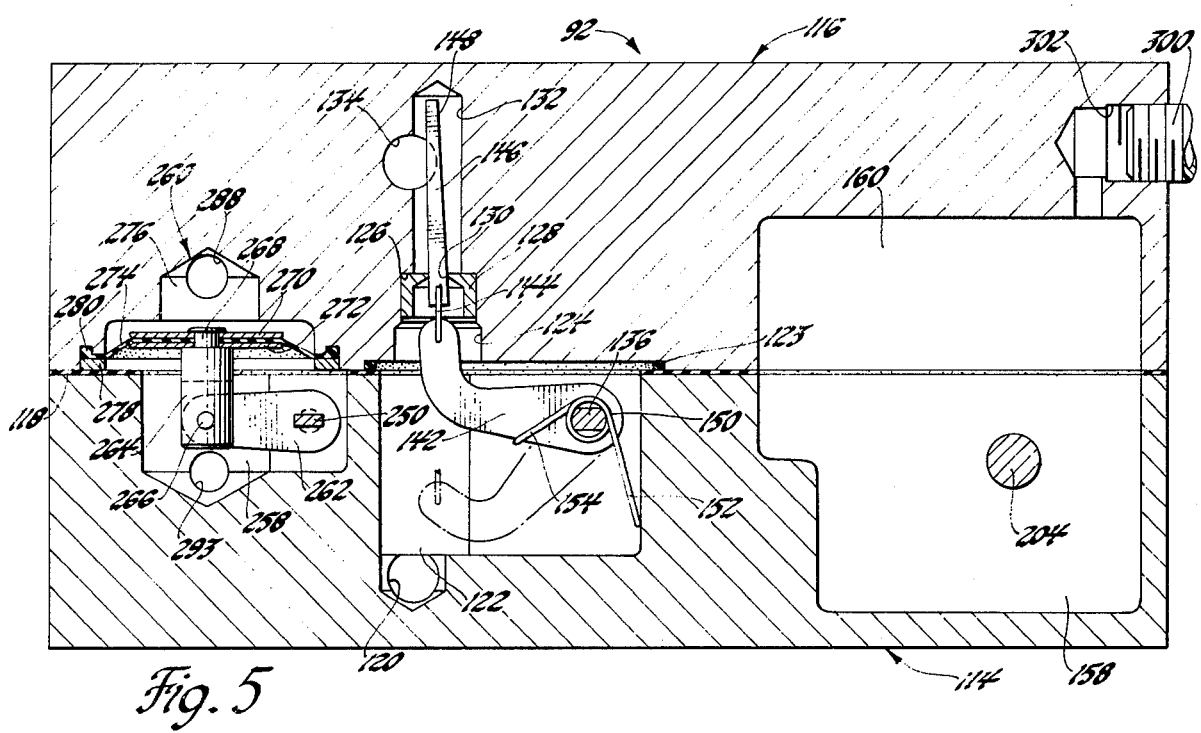

FUEL CONTROLLER FOR GAS TURBINE ENGINE

This invention relates to controls for gas turbine engines and more particularly to controls for maintaining closely controlled temperatures in a low emission burner of a two-shaft regenerative gas turbine device.

Two shaft regenerative gas turbines include an air compressor that supplies air to a combustion apparatus or burner in which fuel is consumed to supply motive fluid to a turbine which drives the compressor. The engine also includes a second turbine downstream of the first turbine that receives the gas flow therefrom to power an output shaft connected to vehicle wheels through a suitable transmission. Such engines may also include a regenerator for retrieving waste heat from the exhaust of the engine to preheat the compressor air piror to its passage into the combustion apparatus.

It is recognized that reduced emissions can be obtained by controlling the combustion temperature in the burner of a gas turbine. One proposal has been to locate primary air ports in the combustion apparatus to thoroughly mix the fuel and air where it is combusted. Also, such systems include a secondary air port arrangement therein to dilute the combustion gases to a temperature compatible with the turbine output power desired, and metallurgical limits.

An object of the present invention is to establish the control of the percentage split between primary and secondary air to the burner apparatus of a gas turbine engine through an improved foot control throttle arrangement which is coupled to both a splitter valve for primary and secondary burner air control and also to a fuel lever for regulating fuel flow to the burner such that the temperature of the primary combustion zone therein is held at a desired temperature level without requiring that the temperature within the combustion zone be sensed and also without requiring servo actuation of the variable splitter valve for splitting air flow at the burner; and wherein means are provided to sense the compressor inlet air flow and to automatically adjust fuel flow across a single adjustable needle valve to control the fuel in proportion to first; the primary air flow to the engine burner and second; to burner inlet temperature.

Still another object of the present invention is to provide an improved control system for maintaining controlled temperature conditions in the burner assembly of a gas turbine engine by the provision of throttle control means for reducing the quantity of secondary air flow to the burner assembly in response to increased throttle settings and wherein fuel control supply means to the burner is coupled to the throttle to control a single metering rod to vary an orifice fuel flow area in accordance with the percentage split between primary and secondary air flow to the burner. assembly and wherein further means are included to adjust orifice area in accordance with the temperature of the primary air entering the burner assembly, and with fuel control to the burner assembly being further controlled by means for varying the pressure difference across the variable orifice area in accordance with the mass flow of air into the inlet of the engine compressor so that greater or lesser fuel flow will be produced in accordance with changes in compressor air flow.

Still another object of the present invention is to provide a simplified fuel controller for association with a two shaft regenerative gas turbine engine including a metering orifice having a single movable metering rod therein coupled to a metering rod shaft that is coupled by a multiplier link and lever arrangement to a thermostatically controlled lever that is positioned in accordance with the temperature of inlet air to the engine burner and wherein a throttle shaft has a throttle output lever connected thereto for positioning the multiplier linkage to establish a predetermined controlled fuel flow area to a burner assembly in accordance with throttle setting; the controller further including a pressure responsive component for sensing air flow to the compressor operative to position a bypass valve to vary the control of a fuel pressure regulator for bypassing excess fuel back to the intake side of a fuel supply pump to maintain a fuel air ratio in accordance with primary air flow to the burner of the engine.

A further object of the present invention is to provide an improved controller for positioning a single fuel control metering rod in accordance with a control setting for distributing discharge air from a turbine engine air compressor to primary and secondary ports of a low emission burner with improved means being provided to couple a throttle shaft with a metering rod shaft in the form of a multiplier lever and link slidably supported on a throttle output lever and adjustably positioned in accordance with a thermostatic coil for sensing the temperature of inlet air to the turbine engine burner and wherein further control of fuel flow across the fuel supply metering rod is obtained by means for controlling the pressure differential thereacross including a bypass pressure regulator that is responsive to the mass flow of air into the inlet of the turbine engine compressor thereby to regulate the fuel supply to a combustor of the turbine engine in accordance with the percentage of compressor discharge air directed into primary air ports of the combustor assembly and wherein the percentage split between air flow from the compressor to the primary and secondary ports of the combustion apparatus is determined in accordance with the throttle setting.

Still another object of the present invention is to maintain substantially constant flame temperature condition in the primary zone of a low emission burner for supplying motive fluid to a power turbine of a two shaft regenerative gas turbine engine by controlling the area of a metering orifice for fuel supplied to the burner in accordance with the ratio of compressor discharge air directed respectively to primary and secondary air flow ports in the burner with an improved multiplier link and lever arrangement being utilized to couple the throttle shaft to a metering rod shaft and wherein the pressure differential across the variable flow area is further modified by means to reflect the mass flow of air into the compressor inlet and by means for varying the bypass of excess fuel back to the fuel supply in accordance with the amount of mass flow of air into the compressor with the controller establishing the discharge temperature of the turbine engine burner directly proportional to the throttle position under steady state conditions and with the temperature of the exhaust from the burner being greater than the throttle control under acceleration and less than proportional to the angle of the throttle control when the vehicle is decelerated.

Further objects and advantages of the present invention will be apparent from the following description, reference being had to the accompanying drawings wherein a preferred embodiment of the present invention is clearly shown.

FIG. 5 is a vertical sectional view taken along the line 5—5 of FIG. 3 looking in the direction of the arrows;

FIG. 6 is a vertical sectional view taken along the line 6—6 of FIG. 3 looking in the direction of the arrows;

FIG. 7 is a view taken along the line 7—7 of FIG. 3; and

FIG. 8 is a chart showing the fuel supply characteristics produced by the controller in FIGS. 2 to 7.

Figure 1:
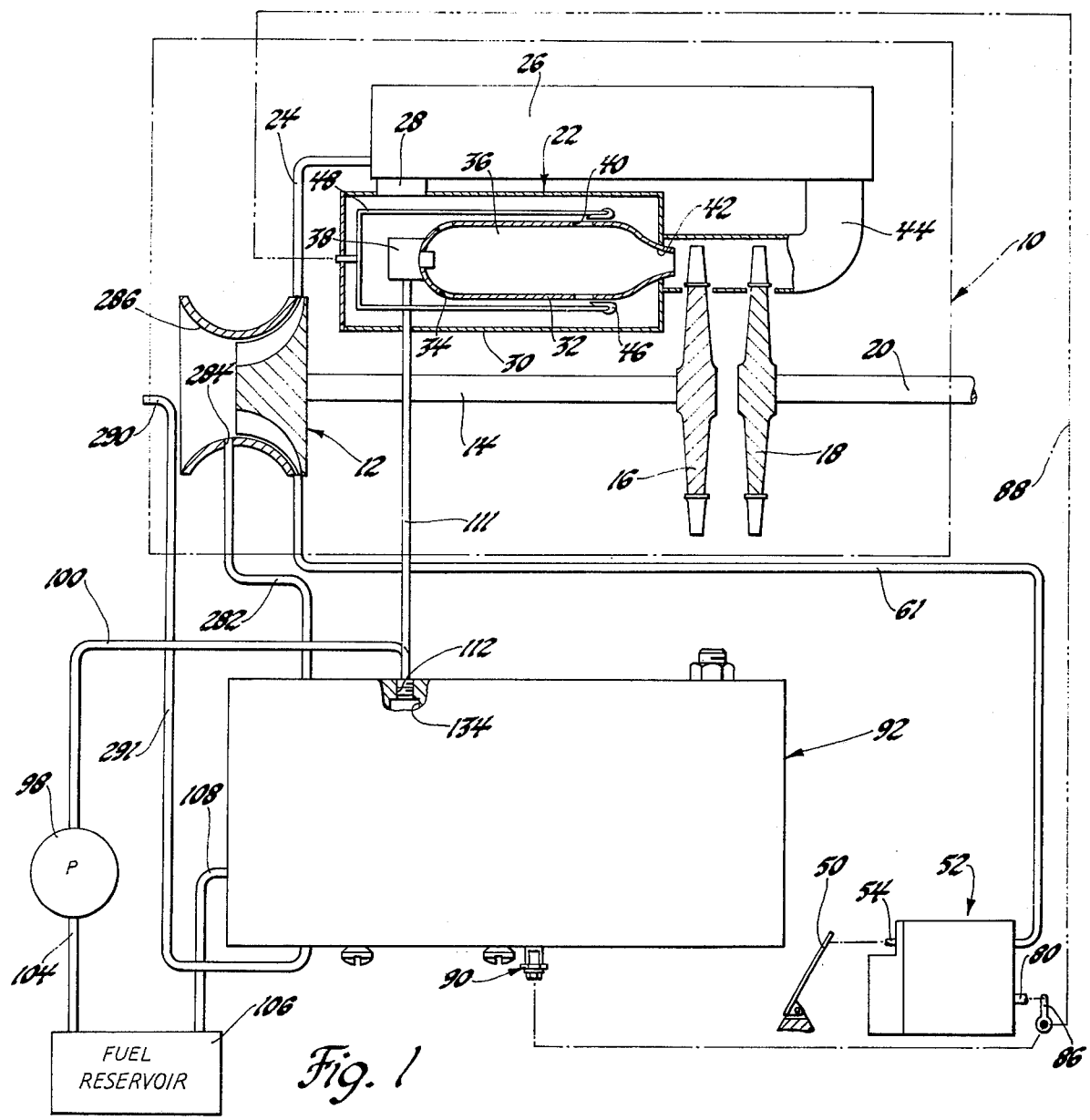
FIG. 1 is a diagrammatic view of a two-shaft, regenerative gas turbine engine including the control system of the present invention.

Referring now to the drawings in FIG. 1, a two shaft regenerative gas turbine engine 10 is diagrammatically illustrated. It includes a compressor 12 connected by a shaft 14 to a gasifier turbine 16. The engine further includes a power turbine 18 connected to an output shaft 20 that is coupled through suitable transmission to the drive wheels of a vehicle.

The diagrammatically illustrated engine further includes a low emissions type burner assembly 22. Air supply to the burner assembly 22 is directed from a discharge conduit 24 of the compressor 12 to a regenerator 26 from whence it is directed through the inlet 28 of an outer casing 30 surrounding a burner liner 32 having primary air ports 34 at one end thereof directed into a combustion zone 36 for mixture with fuel from a fuel nozzle 38. The combustion products are cooled by air flow through a plurality of secondary air ports 40 in liner 32 upstream of an exhaust opening 42 from the burner assembly 22. Exhaust through the opening 42 is directed across the turbines 16, 18 and through an exhaust plenum 44 for passage through the regenerator 26 for extracting energy from the engine exhaust to raise the inlet temperature of the air flow from the compressor into the burner assembly 22.

The low emission burner 22 includes an annular valve element 46 connected to a carriage 48 for reciprocation with respect to the burner liner 32 to provide a percentage split of the compressor air flow from inlet 28 between the primary and secondary burner ports 34, 40.

Figure 2:
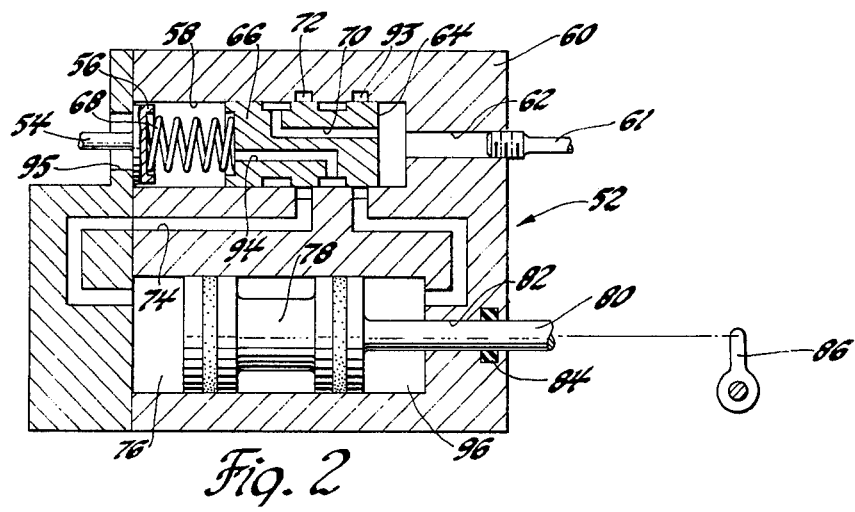
FIG. 2 is an enlarged vertical sectional view of a servo actuator for coupling an accelerator pedal to a fuel lever shaft and an air splitter valve of the present invention.

In accordance with the principles of the present invention the percentage split is under the control of a foot control accelerator pedal 50 that is connected by means of a servo actuator 52 as best illustrated in FIG. 2 to the carriage 48 for controlling the relative position of the valve 46 with respect to the secondary ports 40 and thence the percentage split of air between primary air ports 34 and secondary air ports 40.

The servo actuator 52 includes a slidable shaft 54 coupled to the pedal 50. It has a spring retainer 56 connected thereto slidably received in a bore 58 in the actuator housing 60. The bore 58 is in communication with a compressor discharge pressure conduit 61 connected to a port 62 in the housing so as to direct compressor discharge pressure against one end 64 of a spool valve 66 slidably supported in the bore 58. On acceleration, spool valve 66 is moved to the right by a coupling spring 68 until a spool passage 70 is aligned with an annular groove 72 in the housing 60 which is in communication with a passage 74 to a pressurizable chamber 76 on one side of a servo piston 78 that is connected to a shaft 80 directed outwardly of the housing 60 through a bore 82 therein which is sealed by means of an O-ring 84. The compressor discharge pressure is directed through the passage 70 and the aligned annular groove 72, passage 74 to the pressurizable chamber 76 to shift the piston 78 to the right during an acceleration mode of operation. The shaft 80 is coupled to a lever 86 for operating suitable linkage 88 coupled to the variable geometry valve 46 on the carriage 48 to move it leftward as viewed in FIG. 1 to reduce secondary air flow on acceleration. The lever 86 also is coupled to a fuel lever shaft 90 in a fuel controller 92 to be described. Acceleration by pressing down on the pedal 50 will operate the throttle shaft 54 to increase fuel supply as more primary air is directed to the burner assembly 22.

The spool valve 66 will move to the right until the foot pedal pressure is balanced by the compressor discharge pressure which builds up as the engine accelerates. On deceleration the compressor discharge pressure acts on the end 64 of the spool valve 66 against the force of the spring 68 to shift the spool 66 to the left thereby to directly communicate an annular groove 93 in the servo actuator housing 60 with the compressor discharge pressure while concurrently communicating the pressurizable chamber 76 with a spool exhaust passage 94 that communicates through housing port 95 with atmosphere so as to relieve pressure in the chamber 76 while applying pressure to the chamber 96 on the opposite end of the servo piston 78 to cause the piston 78 to shift to the left and thereby return the control lever 86 to an idle position wherein the variable geometry valve 46 will be opened as illustrated in FIG. 1 and the fuel lever 90 will be positioned to reduce fuel supply in a manner to be discussed.

Figure 3:
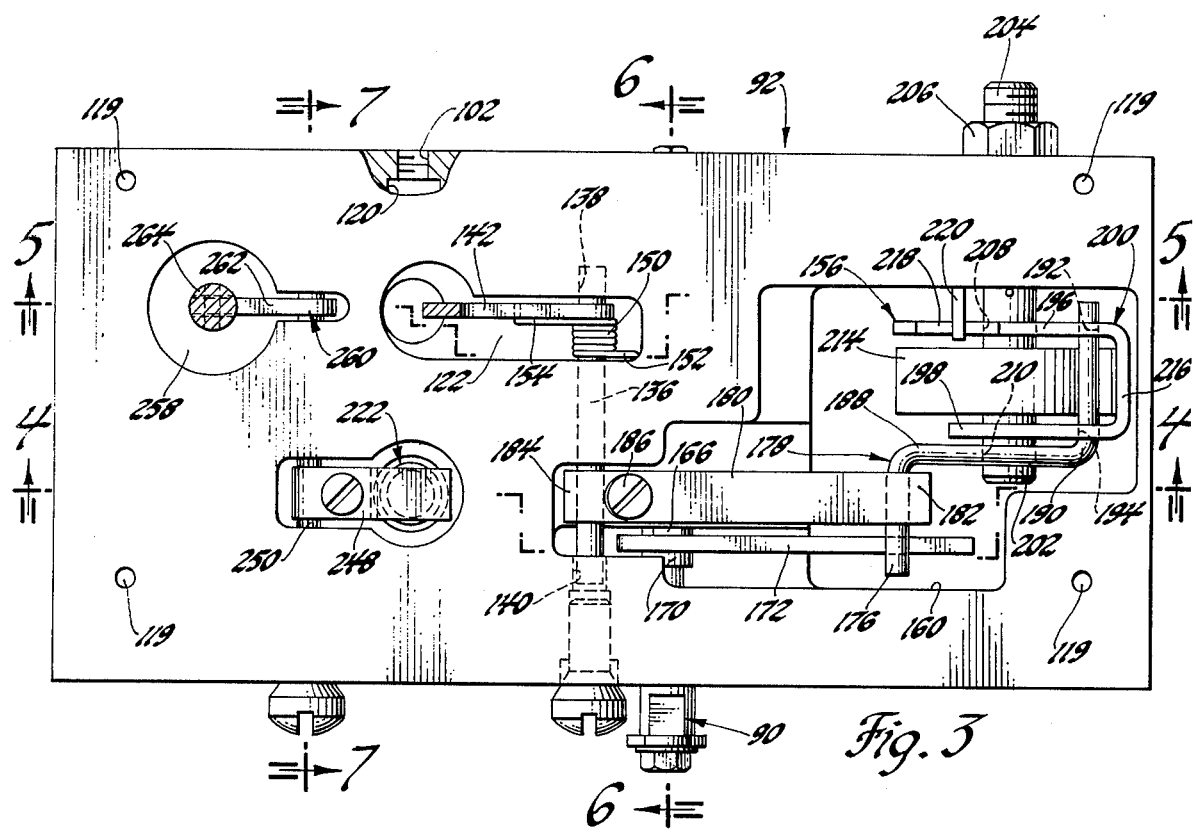
FIG. 3 is a top elevational view of a fuel controller in the present invention with its cover removed.

The system further includes a fuel supply including a fuel pump 98 having its outlet connected to a discharge line 100 in communication with an internally threaded inlet port 102 to the controller 92 as best seen in FIG. 3.

Figure 4:
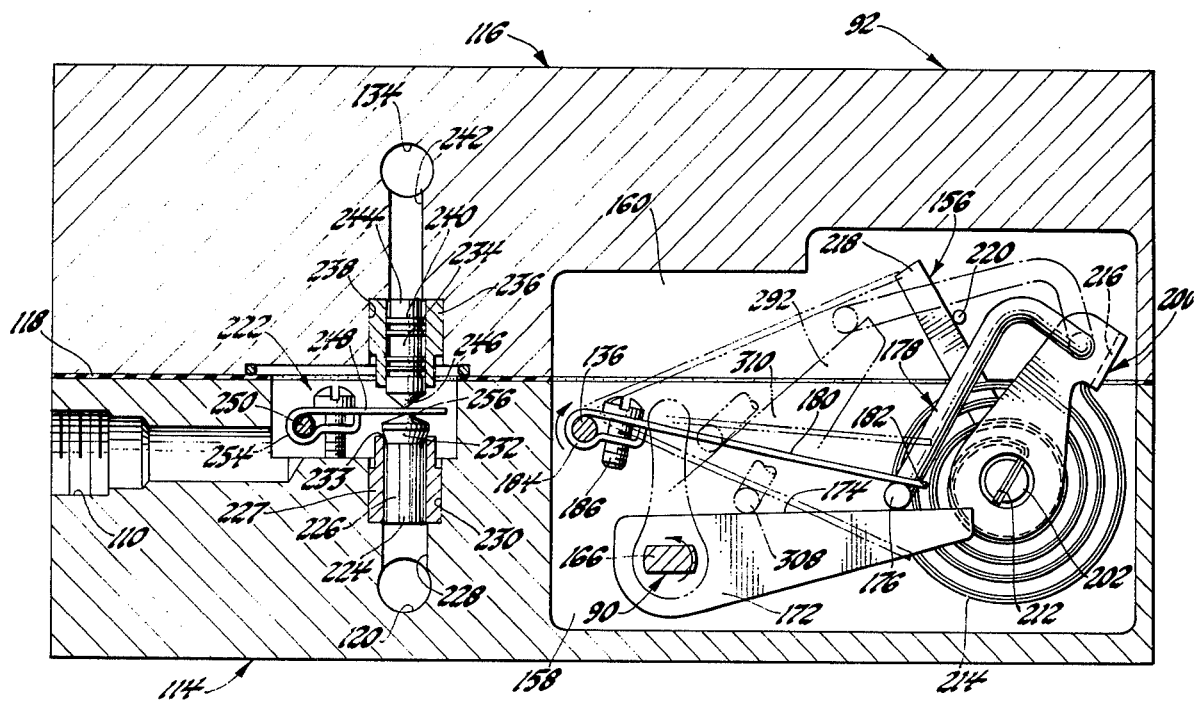
FIG. 4 is a vertical sectional view taken along the line 4—4 of FIG. 3 looking in the direction of the arrows.

The pump has its inlet connected to a suction line 104 in communication with a fuel reservoir 106, a by-pass conduit 108 is connected to an internally threaded port 110 in the controller as best seen in FIG. 4 to return excessive fuel to the reservoir 106. Fuel supply from the controller 92 is directed through a fuel supply conduit 111 connected at one end to an internally threaded outlet port 112 in the controller and at the opposite end to the nozzle 38 for the burner assembly 22.

Referring now to FIGS. 3 to 7, the controller 92 includes a housing base 114 and a cover 116 having a gasket 118 interposed therebetween. Suitable fastening means such as a plurality of screws 119 are directed through the housing base 114 and the cover 116 for securing the two together and for sealingly locating the gasket 118 therebetween.

The housing includes a fuel supply circuit from the inlet port 102 through a bore 120 formed transversely in the housing base 114 which intersects with a fuel chamber 122 in base 114, best seen in FIG. 5. The fuel chamber 122 is sealed by O-ring 123 and is in communication with a vertical bore 124 having a counterbore 126 in which is seated a fuel metering jet 128 having an orifice 130 therein. Downstream of the orifice 130 the bore 124 includes a reduced diameter section 132 that intersects an outlet bore 134 formed transversely of the housing cover 116 that is in communication with the outlet port 112 connected to the fuel supply conduit 111.

A metering rod shaft 136 has opposite ends thereon rotatably supported in bearing surfaces 138, 140 formed within the housing base 114 on either side of the fuel chamber 122. The shaft 136 is connected to one end of a metering rod lever 142 that is connected by a bent wire stem 144 to an elongated metering rod 146 supported for reciprocation with respect to the orifice 130 and including a tapered surface 148 thereon for varying the cross sectional flow area between the rod 146 and the orifice 130 to regulate fuel flow between the inlet bore 120 and the outlet bore 134. The shaft has a bias spring 150 wound therearound with one end 152 engaging a sidewall of the chamber 122 and a second end 154 bent into engagement with the underside of the lever 142 so as to bias it for clockwise rotation with respect to the axis of the shaft 136 as viewed in FIG. 5 thereby to position the metering rod 146 forward to closed position.

The controller 92 further includes a thermostatically controlled multiplier mechanism 156 located within an opening 158 formed in the base 114 and an opening 160 formed in the cover 116 as best seen in FIG. 4.

The mechanism 156 includes a fuel lever shaft 90 with a portion 162 directed through a bearing bore 164 on one side of the base 114 as best seen in FIG. 6, and an inboard extension 166 thereon extending into a bore 168 aligned with the bearing bore 164. The shaft 90 includes a shoulder 170 thereon to locate one end of a throttle output lever 172 axially with respect to the shaft extension 166. The throttle output lever 172 includes a flat upper surface 174 thereon engageable with a bent end 176 of a multiplier link 178 that is in engagement with the underside of an elongated multiplier lever 180 including a free end 182 thereon and an opposite looped end 184 thereon fixedly secured to the metering rod lever 136 by means of a clamp screw 186 directed through the looped end 184 for fixing it with respect to the shaft 136. The multiplier link 178 is bent upwardly on the inboard side of the lever 180 as seen in FIG. 3 at 188 and includes a 90° bend 190 therein which extends through aligned openings 192, 194 formed respectively in first and second leg portions 196, 198 of a thermostat lever 200.

The thermostat lever 200 is pivotally supported on an arbor 202 having a threaded end 204 extending outwardly of the base 114 to receive a nut 206 for fixedly securing the arbor with respect to the base 114. The arbor 202 is directed through spaced openings 208, 210 formed respectively in the leg portions 196, 198 whereby the thermostat lever 200 is supported for pivotal movement with respect to the fixed arbor 202. Further, the arbor 202 includes a split opening 212 therein to retain one end of a bimetallic coil 214 having the opposite end thereof fixedly secured to a bight portion 216 of lever 200 which joins the leg portions 196, 198.

The lever 200 further includes a standing leg portion 218 directed from the leg portion 196 and engageable with a stop pin 220 formed in the cover 116 to limit the wide open hot throttle position of the mechanism 156.

In addition to the multiplier mechanism 156, the controller 92 includes a pressure regulator assembly 222 best seen in FIG. 4 as including a pressure regulator piston 224 having a fluted stem 226 slidably supported in a piston bushing 227 seated within a counterbore 230 formed in the base 114 in alignment with a bore 228 that intersects the transverse fuel supply bore 120 at a point to one side of the fuel chamber 122. The piston 226 includes a valve element 232 on one end thereof that is seated against an annular end 233 of the bushing 228 to define a valve seat sealed by the valve element 232 when the piston 226 is in a closed position.

The piston 226 is bias closed by a bias piston 234 slidably supported within a bushing 236 that seats in a counterbore 238 in the cover 116 immediately above the counterbore 230. The bias piston 234 includes a plurality of axially sealing lands 240 thereon to seal against fluid leakage from a pressure bore 242 that communicates the outlet bore 134 with an end face 244 on the bais piston 234. The bias piston 234 is shifted downwardly in response to fuel pressure in the bore 134 corresponding to burner nozzle fuel pressure and a conical tip 246 thereon bears against the upper surface of a pressure regulator lever 248 to cause it to pivot clockwise about the axis of a pressure regulator shaft 250 that is rotatably supported within a transverse bore 252 in the housing base 114 as best seen in FIG. 7. The lever 248 has one end 254 thereof bent around the shaft 250 as viewed in FIG. 4 and includes a free end thereof that extends between the conical tip 246 on the bias piston 234 and a like conical tip portion 256 formed on the pressure regulator valve element 232.

The pressure regulator shaft 250 extends through a pressurizable chamber 258 of an air flow sensor assembly 260 located between the housing base 114 and the cover 116 to one side of the metering rod 146 as best seen in FIG. 5. Assembly 260 includes a lever 262 secured to the shaft 250. A stem 264 is pivotally connected by means of a pin 266 to one end of the lever 262 and includes a head portion 268 thereon upset to secure plates 270, 272 on either side of a flexible diaphragm 274 that separates the pressurizable chamber 258 from a second pressurizable chamber 276. A spacer element 278 is located between the base 114 and the cover 116 to fixedly secure a peripheral edge 280 of the movable diaphragm 274 within the control housing.

The pressurizable chamber 276 is connected to a pressure signal line 282 having one end thereof connected to a static head sensing port 284 in the inlet 286 of the compressor 12 to detect the static air pressure at the inlet of the compressor 12. This pressure is directed to a side bore 288 in the housing cover 116 into the chamber 276.

The control further includes a Pitot tube 290 located in the inlet 286 of the compressor 12 for sensing the velocity pressure of the air flow therethrough. The Pitot tube 290 is connected by means of a pressure signal line 291 to a bore 293 in base 114 for applying velocity head to chamber 258. This produces a pressure differential across diaphragm 247 to indicate the mass flow of air to the compressor 12.

The aforedescribed controller 92 in association with the pedal controlled throttle action is operative to produce a primary zone flame temperature in the combustion chamber that is controlled to reduce burner emissions.

The controller 92 includes three operating modes including a steady state mode wherein the exhaust temperature from the burner assembly 22 corresponds to the throttle setting. Under acceleration modes of operation the burner exhaust temperature will exceed the steady state condition for a given throttle setting thereby to produce additional power output through the turbine shaft 20. Under deceleration conditions the control operates to reduce the turbine output temperature as compared to the steady state output temperature for a given throttle position thereby to reduce the output power from the turbine shaft 20 when no longer required as the vehicle is decelerated.

When the foot pedal 50 is in an idle position under cold start engine conditions the output lever 172 assumes the solid line position in FIG. 4. The thermostatic coil 214 will position the multiplier link 178 in the solid line position shown at 292 in FIG. 4 thereby to position the multiplier lever in the illustrated solid line position. This will position the metering rod shaft 136 counterclockwise as viewed in FIG. 4 to position the metering rod 146 in a relatively open position with respect to the orifice 130 thereby to produce a rich (cold regenerator) idle fuel supply to the burner assembly 22. During this mode of operation the pressure regulator assembly 222 is operative to bypass excess fuel supply through the pressure regulator piston 226 back to the inlet of pump 98. Further control of the bypass fuel is obtained by the action of the air flow sensing mechanism 260 that will determine the mass flow of air into the intake of the compressor 12 so that the bypass fuel will be further regulated in accordance therewith to control the air/fuel ratio to the primary zone of the burner assembly 22.

When the pedal 50 is depressed to accelerate the engine under cold conditions the fuel output lever 172 will assume the broken line position shown at 292 in FIG. 4 and thereby lift the multiplier link 178 along with the multiplier lever 180 to the broken line position shown in FIG. 4 thereby to produce a counterclockwise rotation of the metering rod shaft 136 to produce a further increase in the cross sectional flow area through the orifice 130. Concurrently, the servo actuator 52 will also operate the carriage 48 of the variable geometry control valve 46 to close the air ports to produce an elevation of the combustion temperature at the exhaust of the burner assembly 22. Acceleration will cause increased flow of air to the burner assembly 22. This is sensed by the air flow sensing mechanism 260 with increased air flow biasing diaphragm 274 upwardly as viewed in FIG. 5 to rotate shaft 250 to cause lever 248 to press downwardly on piston 226 thereby to reduce the amount of bypassed fuel flow in accordance with the increased air flow passing into the combustion chamber so as to match the fuel supply to the increased air flow under wide open throttle cold operating conditions. After engine (regenerator) warm-up, the fuel supply curve on acceleration is illustrated by the curve 294 in FIG. 8 which shows that as the primary air percentage is increased the fuel supply will be commensurately increased to maintain the desired air fuel ratio in the combustion zone 36 of the low emissions assembly 22.

In the graph of FIG. 8 the curve 296 is a chart of the percentage of the air flow to compressor 12 that is directed as primary air through the primary air ports 34 of the combustor assembly 56 because of the setting of carriage 48 by the shaft 80.

As the vehicle is decelerated the fuel supply is regulated along the control line illustrated at 298 in FIG. 8. This is accomplished by movement of spool 60 to cause shaft 80 to retract and thus command low fuel flow area and low primary burner flow, high secondary flow and low burner exit temperatures. All this occurs at constant primary zone temperature for accurate control of emissions. The lever 248 acts to remove the biasing action of the piston 240 which results in the opening of the valve element 232 thereby to bypass more fuel to the inlet of the fuel pump 98 so as to control the primary zone air fuel ratio as illustrated to maintain a combustion primary zone temperature at a temperature to maintain reduced burner emissions.

When the vehicle is operated under conditions where the regenerator raises the air temperature at the inlet 28 of the combustor assembly 22 the air flow through the inlet 28 from the regenerator 26 is bypassed through an air heater line 300 from inlet 28 to an air heater port 302 in cover 116 across a needle valve 304 to flow through the chamber 158 thence out of an exhaust port 306 in base 114. This will cause the thermostatic coil 214 to wind up so that the fuel supply to the burner assembly will be adjusted for an increased inlet temperature of air flow thereto. Thus when the throttle is in the idle throttle position the multiplier link 178 will be moved along the flat surface 174 on lever 172 toward shaft 162 to locate the multiplier lever 180 in the broken line position at 308 in FIG. 4 to locate the metering rod shaft 136 in a more clockwise position from the cold idle throttle position thus to reduce the cross-sectional flow area of fuel flow through the orifice 130 to reduce the fuel supply in accordance with the increase of the primary air inlet temperature to the burner assembly 22. Likewise under wide open throttle hot conditions the thermostat lever 200 will be positioned by the coil 214 to cause the multiplier link to assume its inboard position on lever 172 to locate the multiplier lever in the position shown at 310 in FIG. 4. This positions shaft 136 more clockwise from the cold wide open throttle position so that a reduced fuel supply will be directed to the burner assembly 22 to compensate for the increase temperature of primary air directed thereto.

The system is self compensating in that increases in the output temperature from the burner assembly 22 will increase air flow to compressor 12 to raise the velocity head to increase fuel as a positive feedback closed loop to control vehicle acceleration to limit transient speed and power. The converse happens on deceleration. Furthermore, the arrangement maintains a controlled temperature condition within the burner assembly 22 during both acceleration and deceleration so as to avoid excessive emissions from the burner assembly 22 and excessive power surges in the engine itself.

For satisfactory response in two shaft gas turbine engines it is desirable that very high temperature burner exhaust in the range of 2200°F and very high fuel flow occur for transient periods in the order of one second during acceleration. This transient schedule needs to be automatic (not operator controlled) and desirably is inherent in the control. FIG. 2 illustrates how this can be done by "governing" compressor discharge pressure at passage 62.

In a step "idle to 100 percent Power" command the servo actuator 52 responds to cause shaft 80 to move to the right momentarily to execute very high percentage of primary air flow, and high fuel flow. This produces a burst of heat from burner assembly 22 which partly is absorbed in the turbines 16, 18; but in the low inertia primary stage at 16, high turbine torque reacts to accelerate the compressor 12 to top speed before metallurgical problems are manifested. High speed of course feeds back as increased compressor discharge to produce a restoring force on spool 66 to retract servo piston 78 and achieve a steady state fuel flow to maintain acceleration.

For deceleration, the thermal inertia of the hardware in servo actuator 52 acts in reverse. The desirable turbine inlet temperature is less than idle to conserve energy while executing the command. Fuel flow needs to be reduced to near flameout which may be less than idle fuel flow. Again as the compressor discharge pressure approaches that set by the deceleration command, the higher idle fuel rate is restored to avoid speed droop below rated idle. This is produced since spool 66 responds to reduced compressor discharge pressure to cause piston 78 to move far left as seen in FIG. 2 during the transient. It extends again at idle to avoid speed droop.

Thus the compressor discharge governor effect in servo actuator 52 permits significantly better dynamic response while restricting steady state operation to desirable limits. The governor concept further implements a desirable servo action to position burner geometry. By controlling pneumatic restrictions and capacitance, the stroke of piston 78 and resultant controller dynamics can be matched to the engine dynamics.

While the embodiments of the present invention, as herein disclosed, constitute a preferred form, it is to be understood that other forms might be adopted.

What is claimed is:

1. An air fuel ratio controller for association with a two shaft gas turbine engine having an air compressor driven by a first shaft connected to a gasifier turbine to supply combustion air through a regenerator to a burner assembly having primary air ports and secondary air ports and a throttle controller for changing the percentage ratio between primary air and secondary air in accordance with the throttle position and a fuel pump supplying fuel for delivery to a burner nozzle comprising: a control housing having first and second pressurizable chambers therein, means for producing a total and static pressure signal of air flow to the inlet of the compressor and directing it respectively to said first and second chambers, a movable wall for separating said chambers and responsive to the differential of the total and velocity pressure signals, a fuel supply passage in said housing having an inlet connected to the outlet of the fuel supply pump and an outlet connected to the fuel nozzle, a metering orifice in said fuel supply passage, a single metering rod movable with respect to said fuel metering orifice to vary the fuel metering orifice flow area, means for regulating the fuel pressure on the inlet side of said fuel metering orifice including a fuel bypass in said housing having an inlet connected to the fuel pump outlet and an outlet connected to the fuel pump inlet, a pressure regulator piston located within said bypass including valve means thereon selectively positioned to bypass excess fuel from the fuel supply passage back to the inlet of the pump in accordance with inlet pressure of said metering orifice, a bias piston bore in said housing, a bias piston within said bore operative to control bypass of fuel in accordance with the pressure drop across said metering orifice, means to vary the metering head across said orifice proportionally to the air velocity head differential across said movable wall, said valve means being responsive to an increase in the air velocity head to close the pump bypass and being responsive to an increase in the pressure differential across the metering orifice in response to increased fuel flow thereacross to produce a counterbalance to restore a predetermined air/fuel ratio to the burner assembly, a throttle shaft in said housing, means for coupling said throttle shaft to said single metering rod and operative to establish a predetermined fuel supply to the burner in accordance with the primary air flow thereto, a thermostat chamber in said controller, means for directing inlet air to the burner assembly through said chamber, an arbor fixedly secured to said housing directed through said chamber, a thermostat lever pivotally supported on said arbor for rotation relative thereto, a thermostatic coil having one end thereof fixed to said arbor and the opposite end thereof connected to said lever for producing a controlled rotation of said lever with respect to said arbor in response to changes in the burner inlet air temperature, and multiplier link means coupling said throttle shaft to said metering rod shaft for controlling the fuel metering flow area and air fuel ratio of the burner assembly in accordance with the inlet air temperature to the burner to produce a predetermined primary combustion temperature in the burner.

2. An air/fuel ratio controller for association with a two-shaft gas turbine having a compressor driven by a first shaft driven by a gasifier air turbine to supply combustion air through a regenerator to a burner having primary and secondary air ports with air flow regulated thereto by means including an engine throttle to establish a predetermined control temperature in the primary combustion zone of the burner and wherein the burner includes a fuel nozzle for receiving fuel from a supply including a positive displacement fuel supply pump comprising: a control housing having first and second pressurizable chambers therein, means for sensing a velocity head signal of the air flow to the inlet of the turbine engine compressor and directing it to said first and second pressurizable chambers, a movable wall for separating said chambers and responsive to the velocity head signal, a primary fuel supply passage in said housing having an inlet connected to the outlet of the supply pump and an outlet connected to the fuel nozzle of the burner, a metering orifice in said supply passage, a single metering rod movable with respect to said orifice for controlling the fuel flow area therethrough, first shaft means for controlling the position of said metering rod in said orifice, second shaft means connected to the engine throttle, thermostatic means for sensing the inlet air temperature to the burner, multiplier means for coupling said second shaft means to said first shaft means to enrich air fuel ratio to the burner by increasing fuel flow area through the metering orifice in accordance with the inlet air temperature to the burner relative to the position of the engine throttle reflecting the primary air flow to the burner, fuel pressure regulator means for bypassing excessive fuel back to the fuel supply including a bypass passage in said housing having a pressure regulator piston therein, said pressure regulator piston including valve means operative to regulate flow through said bypass passage, means for controlling said regulator piston in accordance with the air velocity head sensed by said movable wall to reduce the bypass of fuel from the inlet to the outlet of the fuel supply pump in accordance with increases in the mass flow of air into the engine compressor, and means for sensing an increased pressure differential across the metering orifice to counterbalance the operation of said air velocity head signal to increase fuel flow to the burner to maintain a desired primary air/fuel flow ratio thereto, said thermostatic means being responsive to decreased burner inlet air temperatures to produce increased fuel flow to maintain optimum burner temperatures for reduced emissions therefrom.

3. An air fuel control system for a gas turbine engine comprising: an air compressor having an inlet and an outlet, a first shaft connected to said compressor, a first turbine connected to said shaft, a turbine burner having a primary air port thereto and a secondary air port thereto, valve means for directing the compressor discharge air in a controlled ratio between said primary and secondary air ports of said burner, means for directing combustion products from said burner across said first turbine, a second turbine, a power shaft connected to said second turbine, means for driving said second turbine by exhaust gases from said first turbine, throttle control means coupled to said valve means, a fuel supply system including a single variable orifice means therein, means coupling said throttle control means to said single variable orifice means to increase the supply of fuel to the burner when a greater percentage of the discharge air from the compressor is directed to the primary port of said burner, means including a fuel pump having an inlet and an outlet for producing a fuel flow across said single variable orifice means, a regulator valve for bypassing excess fuel from the inlet of the fuel pump to the outlet thereof, said regulator valve including means responsive to the pressure differential across the single variable orifice means to control bypass flow and means responsive to the velocity head of air flow into the compressor to decrease bypass flow produced by pressure differential across said orifice means to control fuel flow to the burner in accordance with the mass flow of air to the burner, and means for sensing inlet air temperature to the burner for modulating the throttle controlled position of said variable orifice means to further regulate fuel flow thereacross to maintain a preselected temperature within the primary combustion zone of the burner.

4. An air fuel control system for a gas turbine engine comprising: an air compressor having an inlet and an outlet, a first shaft connected to said compressor, a first turbine connected to said shaft, a burner assembly having a primary air port thereto and a secondary air port thereto, valve means for directing compressor discharge air in a controlled ratio between said primary and secondary air ports, means for directing combustion products from said burner across said first turbine, a second turbine, a power shaft connected to said second turbine, means for driving said second turbine by directing exhaust gases thereacross from said first turbine, fuel supply system means for said burner including variable orifice means therein, said fuel supply system means including a fuel supply pump having an inlet and an outlet for producing a fuel flow across said variable orifice means, regulator valve means for bypassing excess fuel from the inlet of the fuel pump to the outlet thereof, said regulator valve means including means responsive to the pressure differential across the variable orifice means to control bypass flow, means responsive to the velocity head of air flow into the compressor to decrease bypass flow produced by pressure differential across said orifice means to control fuel flow to the burner in accordance with the mass flow of air thereto, manually operated throttle actuator means, throttle control servo actuator means including a spool valve and means for resiliently coupling said throttle actuator means to said spool valve, means for biasing said spool valve against operation thereof by said throttle actuator means in response to changes in compressor discharge pressure, said servo actuator means further including a servo piston, means for coupling said servo piston to said valve means and said variable orifice means for adjusting air/fuel flow to the burner in accordance with servo piston operation, means responsive to movement of said spool valve in response to changes in compressor discharge pressure to cause an automatic adjustment of the control position of said servo piston following manual operation of said throttle actuator means to produce a compressor discharge pressure governed control of said valve means and said variable orifice means to produce a transient change in the exhaust temperature of the burner independently of the manual control position of said throttle actuator means and a resultant steady-state control of exhaust temperature of the burner in accordance with the manual control position of said throttle actuator means.

* * * * *